2,751,331

PROCESS FOR SELECTIVELY POLYMERIZING DIOLEFINS

Norman Alpert, Poughkeepsie, and Herbert E. Vermillion, Wappingers Falls, N. Y., assignors to The Texas Company, New York, N. Y., a corporation of Delaware No Drawing. Application November 13, 1951, Serial No. 256,125

10 Claims. (Cl. 196—39)

This invention relates to a process for selectively polymerizing conjugated diolefins in the presence of other polymerizable constituents. The process of the invention is particularly applicable to removing conjugated diolefins from hydrocarbon mixtures such as gasoline and lubricating oils wherein their presence is responsible for the formation of gummy deposits.

In accordance with the process of this invention, conjugated diolefins which are associated in a hydrocarbon mixture with other polymerizable compounds are selectively polymerized by contact with a catalyst in which the main active constituent is a halogen-substituted organic acid in which the alpha-carbon atom is substituted with at least two halogen atoms. Contact of a hydrocarbon mixture with the halogenated organic acid is effected at a temperature between 50 and 200° F. and under such conditions that the catalyst is employed in an amount equivalent to 0.5 to 10 weight per cent of the treated organic mixture.

The process of the invention is particularly useful in removing conjugated diolefins from hydrocarbon fractions. The presence of conjugated diolefins in thermally cracked naphtha and lubricating oil fractions causes the formation of gum and of engine deposits. As a consequence, many processes have been suggested to effect selective removal of conjugated diolefins from thermally cracked naphtha. The main problem involved in removing the conjugated diolefins from naphtha is to discover a reagent or catalyst which selectively reacts or catalyzes the reaction of conjugated diolefins while exhibiting substantially no effect upon the high octane olefins present in the naphtha. Prior to the present invention, selective removal of conjugated diolefins from thermally cracked naphtha has been effected by clay treatment at a temperature of 400 to 500° F. or by treatment with sulfuric acid of 50 to 60 per cent concentration. This invention provides an improved procedure for removing conjugated diolefins from thermally cracked naphtha or other hydrocarbon mixtures wthout harmful effect on other desirable components of the hydrocarbon mixture such as olefins.

The novel treating agent of this invention which acts as a selective catalyst for the polymerization of conjugated diolefins is an organic acid in which the alpha-carbon atom contains at least two halogen substituents. The general formula of the type of materials which can be employed in the process of this invention is

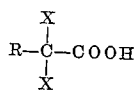

wherein X represents a halogen atom and R is a halogen, hydrogen, an alkyl group or an alkenyl group; if R is an alkyl or an alkenyl group, it may be substituted with one or more halogen atoms. The most commonly used reagents are di- and tri-halo substituted acetic acids. Examples of reagents which effect selective catalyst polymerization of conjugated diolefins are trifluoroacetic acid, trichloroacetic acid, difluoroacetic acid, di-iodoacetic acid, dichloroacetic acid, heptafluorobutyric acid, tribromoacetic acid, 2,2-difluoropropanoic acid and 2,2-dichloro-3-butenoic acid. Successful operation of the process of this invention requires that the organic acid catalyst contain at least two halogen atoms substituted on the alpha-carbon atom. Other halogenated organic acids such as monofluoroacetic acid, monochloroacetic acid, and 2,3,3-trifluoropropanoic acid do not effect selective catalytic polymerization of conjugated diolefins.

It is necessary to employ the halogenated organic acid in an amount equivalent to at least 0.5 weight per cent of the hydrocarbon mixture to be treated in order to effect substantial polymerization of the conjugated diolefins. For treatment of mixtures such as thermally cracked naphtha wherein the conjugated diolefin content is of the order of 1 to 2 per cent, excellent results in selectively polymerizing the conjugated diolefins are obtained with the use of approximately 2 per cent halogenated organic acid. With such mixtures, the use of larger amounts of reagent does not produce any measurable improvement in the efficacy of the treating agent as measured by reduction in General Motors Sludge No. However, in the event that materials containing a substantially higher percentage of conjugated diolefins were to be treated, optimum results will be obtained with larger amounts of treating agent. In general, it can be stated that the quantity of treating agent is dependent on the temperature of treatment and on the amount of conjugated diolefins to be polymerized, and will fall within the range of 0.5 to 10 weight per cent of the total mixture to be treated, with 0.5 weight per cent being the absolute minimum amount with which substantial selective catalytic polymerization of conjugated diolefins is effected.

The temperature at which selective polymerization of conjugated diolefins in the presence of other polymerizable materials is effected is dependent on the amount of reagent that is employed. Temperatures from 50 to 200° F. are employed depending on the concentration of reagent and the duration of contact. It has been discovered that excellent removal of conjugated diolefins from the thermally cracked naphtha is effected by refluxing the naphtha at an average temperature of 140 to 150° F. in the presence of approximately 2 weight per cent alpha-dihalo substituted organic acid. Under these conditions, approximately eight hours are required for effecting substantial polymerization of the conjugated diolefins present in the thermal cracked naphtha.

After contact with an alpha-dihalo substituted organic acid for selective polymerization of the conjugated diolefins, the acid-treated hydrocarbon fraction is water washed, contacted with caustic and subjected to distillation. Caustic treatment can be effected with 10 per cent sodium hydroxide solution or by contacting the liquid hydrocarbon fraction with solid sodium hydroxide. Either straight thermal distillation or steam distillation can be employed to separate the neturalized and washed hydrocarbon fraction from the polymerized conjugated diolefins.

The efficiency of the process of this invention for selectively polymerizing conjugated diolefins is evident from comparison of the Bromine No., the General Motors Sludge No. and the Diene No. of a naphtha fraction prior to and subsequent to treatment with an alpha-dihalo substituted organic acid. The Bromine No. is a measure of the total unsaturated content of hydrocarbon fraction. The General Motors Sludge No. is a colorimetric method for determining the conjugated diolefin content of a fuel fraction. The method is based on the selective reaction of p-nitrophenyldiazonium fluoborate on diolefins, and is described in detail in a booklet entitled "Research Technique for the Determination of Varnish and Sludge Forming Characteristics of Motor Fuels," issued by the Research Laboratories Division of General Motors Corporation. The Diene No. is obtained by correlation with the General Motors Sludge No.

In the following table, there is illustrated the effect of treating thermally cracked naphtha with a halogenated organic acid of prescribed composition in accordance with the process of this invention.

| Treating Agent | Wt. Percent Treating Agent | Bromine No. | G. M. Sludge No. | Diene No. From G. M. Sludge No. | Percent Naphtha Recovery |
|---|---|---|---|---|---|
| Untreated naphtha | | 58 | 104 | 2.9 | |
| Trifluoroacetic* | 2.0 | 54 | 22 | 0.6 | 89.0 |
| Do | 5.9 | 53 | 20 | 0.5 | 87.3 |
| Heptafluoroacetic** | 6.4 | 56 | 26 | 0.8 | 70.0 |
| Dichloroacetic* | 5.9 | 53 | 20 | 0.5 | 87.8 |

Conditions of polymerization:
\* Halogenated organic acid added to mixture which is then refluxed at 140 to 150° F.
\*\* Halogenated organic acid added to mixture which is allowed to stand in a closed vessel at room temperature.

In the above experiments the halogenated organic acid treating agent is merely added to the conjugated diolefin-containing hydrocarbon mixture which is then advantageously refluxed or agitated at the selected temperature. It is also possible to dispose the treating agent on a highly surface-active adsorbent such as silica gel or alumina and contact the conjugated diolefin-containing mixture with the resulting solid treating agent. The use of a solid halogenated organic acid-adsorbent treating agent constitutes a preferred modification of the selective polymerization process of this invention because it results in excellent contact between the conjugated diolefin-containing hydrocarbon mixture and the treating agent. Solid treating agents of this type comprise 5 to 20 per cent halogenated organic acid and 80 to 95 per cent solid particulate adsorbent. Examples of complex treating agents are a 10 per cent trifluoroacetic acid—90 per cent silica gel and a 15 per cent trichloroacetic acid—85 per cent alumina. The complex type catalysts are employed at similar temperature conditions, namely, 50 to 200° F., as are prescribed for the halogenated organic acid per se.

Obviously many modifications and variations of the invention, as hereinbefore set forth, may be made without departing from the spirit and scope thereof and, therefore, only such limitations should be imposed as are indicated in the appended claims.

We claim:

1. A process for selectively polymerizing conjugated diolefins in the presence of other polymerizable materials which comprises contacting a hydrocarbon mixture containing said conjugated diolefins in admixture with other polymerizable materials at a temperature between 50 and 200° F. with a catalyst consisting of at least one halogenated aliphatic carboxylic acid of 2–4 carbon atoms in which the alpha-carbon atom is substituted with at least two halogen atoms said catalyst being present in an amount equivalent to approximately 0.5 to 10 weight per cent of the treated hydrocarbon mixture.

2. A process according to claim 1 in which the catalyst is a fluoro monocarboxylic acid.

3. A process according to claim 1 in which the catalyst is a chloro monocarboxylic acid.

4. A process according to claim 1 in which the catalyst is employed in an amount equivalent to 1 to 2 weight per cent of the treated hydrocarbon mixture.

5. A process for removing conjugated diolefins from a hydrocarbon mixture which comprises contacting said hydrocarbon mixture with a catalyst consisting of a halogenated aliphatic carboxylic acid of 2–4 carbon atoms in which the alpha-carbon atom is substituted with at least two halogen atoms said catalyst being employed in an amount equivalent to 0.5 to 10 weight per cent of the treated mixture, effecting said contact at a temperature of 50 to 200° F. whereby said conjugated diolefins are polymerized and subjecting said hydrocarbon mixture to distillation to obtain a hydrocarbon fraction substantially free of conjugated diolefins.

6. A process according to claim 5 in which the catalyst is a fluoro monocarboxylic acid.

7. A process according to claim 5 in which the catalyst is a chloro monocarboxylic acid.

8. A process according to claim 5 in which the catalyst comprises 5 to 20 per cent halogenated aliphatic monocarboxylic acid and 80 to 95 per cent solid particulate adsorbent.

9. A process according to claim 5 in which thermally cracked naphtha is contacted with 2 weight per cent catalyst at reflux temperature.

10. A process according to claim 5 in which the catalyst is employed in an amount equivalent to 1 to 2 weight per cent of the treated hydrocarbon mixture.

References Cited in the file of this patent

UNITED STATES PATENTS

| 1,839,114 | Morrell | Dec. 29, 1931 |
| 2,141,605 | Hendrey et al. | Dec. 27, 1938 |
| 2,170,336 | Morrell | Aug. 22, 1939 |
| 2,431,756 | Ipatieff et al. | Dec. 2, 1947 |

OTHER REFERENCES

"Catalytic Reactions" by Ipatieff," MacMillan Company, 1936; see pages 607 and 556 only.